United States Patent [19]

Darm

[11] Patent Number: 4,484,396
[45] Date of Patent: Nov. 27, 1984

[54] OXYGEN REDUCTION SYSTEM AND CONDENSER APPARATUS WITH AUTOMATIC DEFROST

[75] Inventor: William J. Darm, Tigard, Oreg.

[73] Assignee: United Air Specialists, Inc., Cincinnati, Ohio

[21] Appl. No.: 152,887

[22] Filed: Jun. 3, 1980

Related U.S. Application Data

[63] Continuation-in-part of Ser. No. 53,819, Jul. 2, 1979, which is a continuation-in-part of Ser. No. 939,334, Sep. 5, 1978, which is a continuation-in-part of Ser. No. 567,258, Apr. 11, 1975, Pat. No. 4,140,175.

[51] Int. Cl.³ ............................ F26B 3/00; F26B 21/06
[52] U.S. Cl. ............................................ 34/36; 34/74; 34/77; 62/177
[58] Field of Search ................... 34/26, 36, 72, 73, 74, 34/77, 78, 79, 131, 155; 203/187; 201/30; 62/177; 432/59, 72

[56] References Cited

U.S. PATENT DOCUMENTS

| | | | |
|---|---|---|---|
| 1,968,910 | 8/1934 | Poole | 34/77 |
| 2,064,084 | 12/1936 | Sando | 34/131 |
| 2,746,168 | 5/1956 | Rickabaugh | 34/51 |
| 3,467,580 | 9/1969 | Weisang et al. | 203/14 |
| 3,472,498 | 10/1969 | Price et al. | 432/72 |
| 3,572,052 | 3/1971 | Toth | 62/278 |
| 3,757,427 | 9/1973 | Wilkinson | 34/32 |
| 3,882,612 | 5/1975 | Try et al. | 34/27 |
| 3,909,953 | 10/1975 | Hemsath et al. | 34/26 |
| 3,936,951 | 2/1976 | Haueise et al. | 432/72 |
| 3,942,264 | 3/1976 | Zenkner | 432/72 |
| 3,947,235 | 3/1976 | Bornert | 432/72 |
| 4,125,593 | 11/1978 | Scheifley et al. | 432/72 |
| 4,145,818 | 3/1979 | Külling | 34/10 |

Primary Examiner—Henry C. Yuen
Assistant Examiner—Harry Tanner
Attorney, Agent, or Firm—Frost & Jacobs

[57] ABSTRACT

A closed loop oxygen reduced gas recirculation system for an industrial dryer includes high volume primary and low volume secondary gas recirculation paths with a condenser apparatus in the secondary path for removing water and solvent. A natural gas burner produces both oxygen reduced gas for the system and the required energy for the dryer. An optional condenser apparatus removes water vapor from the oxygen reduced gas output of the burner prior to its reaching the dryer. The condenser apparatus may include a first heat exchanger and a pair of parallel alternately operating downstream output heat exchangers, such as refrigeration coils. The first heat exchanger condenses most of the water vapor from the dryer gas and vaporized solvent is condensed in one of the output heat exchangers while the other is being defrosted. Sensors detect frost buildup in the operating output heat exchanger and actuate an automatic defrost control which causes dampers to switch and direct exhaust gas to the previously nonoperating output heat exchanger while the previously operating heat exchanger is defrosted, as by a hot defrost gas. Also, the heat exchangers may be of the counterflow type connected such that the cooled exhaust gas is fed back through the heat exchangers in reverse order to act as the cooling fluid. A defrost fluid may be delivered to the nonoperating heat exchanger during defrosting.

18 Claims, 4 Drawing Figures

OXYGEN REDUCTION SYSTEM AND CONDENSER APPARATUS WITH AUTOMATIC DEFROST

CROSS-REFERENCES TO RELATED APPLICATIONS

This application is a continuation-in-part of my earlier filed pending U.S. patent application Ser. No. 053,819, filed July 2, 1979, entitled CONDENSER APPARATUS WITH AUTOMATIC DEFROST, which is a continuation-in-part of my earlier filed pending U.S. patent application Ser. No. 939,334, filed Sept. 5, 1978, entitled TWO-STAGE GAS CONDENSER WITH FEEDBACK COOLING, which is a continuation-in-part of my still earlier filed U.S. patent application Ser. No. 567,258, filed Apr. 11, 1975, entitled VERTICAL COUNTERFLOW HEAT EXCHANGER APPARATUS, which issued into U.S. Pat. No. 4,140,175 on Feb. 20, 1979.

BACKGROUND OF THE INVENTION

The present invention relates generally to apparatus and systems for condensing water and solvent from gas utilizing heat exchangers.

More particularly, the present invention relates to a gas condenser apparatus having a plurality of heat exchangers in which water and other contaminants such as organic solvents are condensed from exhaust gas. The condenser apparatus includes an automatic defrost cycle control for alternately routing the exhaust gases from an input heat exchanger through one of two output heat exchangers while the other output heat exchanger is being defrosted. In one preferred form of the invention, the heat exchangers are each of the counterflow type. In an alternate form of the invention, the output heat exchangers are refrigeration coils. Of course, other types of heat exchangers (i.e. cross flow heat exchangers, parallel flow heat exchangers, heat pipe exchangers, and heat wheels) are suitable as well. The invention further relates to method and system apparatus for reducing oxygen from system gas within an industrial dryer or process oven in which water and solvents are vaporized by recirculating a small portion of the system gas through a condenser apparatus.

Air pollution regulations promulgated by the Environmental Protection Agency of the United States Government require that the amounts of contaminants introduced into the atmosphere from certain manufacturing operations be below specified levels. For example, industrial dryers or process ovens utilized in connection with certain coating processes, e.g. assembly line automobile painting, magnetic tape manufacture, fabric coating, certain printing processes (flexographic and rotogravure) and drying of automobile vinyl, typically involve the vaporization of certain organic solvents such as kerosene, acetone, toluene, and alcohols. In many instances exhaust gas from such equipment must be processed to reduce the concentrations of such organic solvents before the gas can be vented into the atmosphere. In addition, the ever increasing cost of such chemical solvents has made it highly desirable to condense them from the exhaust gas for reusage.

Another problem is that vaporized organic solvents present a significant danger of explosion when present at certain concentration levels. For a given temperature, pressure, and oxygen concentration in an atmosphere, a concentration of vaporized organic solvents below a minimum level called the lower explosive limit (LEL) cannot be ignited. Above a certain maximum vaporized organic solvent concentration called the upper explosive limit (UEL) the atmosphere will also not ignite. The insurance industry often requires that such equipment be operated below a certain maximum percentage of the LEL, e.g. fifty percent, in order to safeguard against explosion. However, minimum capital expenditure as well as the most energy conserving recovery approach depends upon processing exhaust gas heavily laden or having a high concentration of vaporized solvents through a condensing apparatus or some other type of recovery system.

Presently three basic methods are commonly utilized to deal with vaporized organic solvents. A first method involves heating the solvent laden exhaust gas to approximately 1400° F. in order to burn away the solvents. In addition to destroying the solvents, this approach consumes a large amount of fuel to heat the total body of air being treated to 1400° F. Large amounts of carbon dioxide, nitrogen and an appreciable amount of water are liberated. A second method involves passing the exhaust gas across a series of refrigerant cooling coils to eventually condense the vapor. This method requires substantial amounts of energy to operate the cooling coils. A third method, and heretofore believed the most commonly used method, utilizes charcoal bed filtration. The exhaust gas is passed through large flat beds of activated charcoal. Dual beds are used with one being reactivated with live steam and drained while the other is collecting solvent and water. The relatively expensive activated charcoal must be periodically replaced.

Previously, it has been known to use counterflow type heat exchangers as condensers. However, the cooling fluid has been a gas or liquid separate from the gas being cooled, as shown in U.S. Pat. No. 3,827,343 and U.S. Pat. No. 2,169,054. U.S. Pat. No. 3,232,029 discloses a condenser apparatus having a pair of heat exchanger stages for condensing a vaporized organic solvent out of an incoming gas in the first stage, the remaining gas being heated in the second stage. Condensed solvent is collected and drained off from the first heat exchanger stage through an outlet. The gas flowing through the heat exchanger stages comes into contact with coils through which a refrigerated coolant flows countercurrent to the flow of the gas. Due to the heat transferred during the condensation of the vaporized solvent, the coolant entering the coils of the second heat exchanger stage is at a higher temperature than the gas passing through the second stage. Thus, the second heat exchanger stage heats rather than cools the gas passing therethrough. In none of these patents is the cooling fluid provided by feeding back the gas being treated after condensation of water vapor or solvent from such gas.

British patent specification No. 711,067 shows a condenser system employing two heat exchanger stages for cooling. However, the second stage is employed for cooling the cooling liquid used in the first stage. In addition, the cooling liquid is separate from the treated gas which is condensed in the first stage. In none of the above discussed patents is water condensed in one heat exchanger stage while vaporized solvents are condensed in a second heat exchanger stage to separate condensed water and solvent.

Condenser apparatus often collect frost from the water fraction normally found in ambient air in their heat exchangers. This frost buildup tends to obstruct the flow of gas through the heat exchangers and results in a lowering of heat exchange efficiency. This in turn reduces solvent recovery efficiency in those condenser apparatuses designed to handle solvent laden exhaust gas. None of the patents discussed above discloses or suggests the use of an automatic defrost cycle control system to selectively connect one of two heat exchangers into the gas flow path while the other is defrosted, for eliminating frost buildup from a heat exchanger to improve the air flow characteristics and heat exchange efficiency thereof.

In addition, U.S. Pat. No. 3,798,787 of Heen is understood to show a condenser system operating in a nitrogen charged paint dryer environment which employs, in succession, first cooling coils, a cross flow heat exchanger, second cooling coils and perforate plates surrounded by third cooling coils. The second and third coils are in a common chamber and supplied with refrigerant from a single compressor so that they apparently will be operating substantially at the same temperature. Also, Heen states that the second coils include alternately operating halves with one half being de-iced while the other is condensing and vice versa. Additionally, cooled gas from the chamber is fed back through the heat exchanger for cooling purposes. However, Heen differs from the present invention for any one of a number of reasons. For example, because water is not condensed in the upstream heat exchanger, heavy icing will apparently occur at the second set of coils making the system inefficient. Also, separation of water vapor and solvent condensed in the chamber of Heen will be difficult because the second coils apparently will condense both water and significant amounts of solvent together. Also, in Heen, efficient heat transfer within the heat exchanger is impaired because the first cooling coils pre-cool the gas prior to its entry into the heat exchanger and exposure therein in heat transfer relationship to cooled gas from the chamber.

Therefore, a need exists for a more efficient solvent condenser apparatus and solvent drying oven.

SUMMARY OF THE INVENTION

The objects and advantages of the present invention are to provide one or more of the following:

a condenser apparatus for more efficiently recovering vaporized contaminants such as organic solvents;

a condenser apparatus adapted to condense water from solvent laden exhaust gas at one location and to condense the solvent at a second downstream location;

a condenser apparatus of the aforementioned type having counterflow or other type heat exchangers and feedback means for utilizing the exhaust gas as the cooling fluid after water and solvent have been condensed therefrom;

a condenser apparatus having an input heat exchanger stage for condensing water from a solvent laden exhaust gas and a second heat exchanger stage for condensing solvent from the exhaust gas;

a condenser apparatus of the aforementioned type having two separate heat exchangers in its output stage coupled in parallel configuration and an automatic defrost cycle control system for alternately directing the exhaust gas through one of the output heat exchangers while the other one is being defrosted;

a condenser apparatus of the foregoing type in which the two separate heat exchangers in its output stage each comprises a refrigeration coil and in which a defrost system is provided, such as feeding hot defrost fluid through the coil being defrosted for defrosting purposes;

a condenser apparatus of the foregoing type in which the two separate heat exchangers in its output stage each comprise a counterflow heat exchanger;

a condenser apparatus of the foregoing type in which the input heat exchanger stage comprises a counterflow heat exchanger which receives the output gas from the second stage as its cooling fluid;

a condenser apparatus of the foregoing type having a de-mister and blower downstream from the output heat exchanger to improve the efficiency of solvent recovery;

a condenser apparatus which in one form utilizes a plurality of counterflow heat exchangers to reduce the mechanical refrigeration load required to satisfactorily condense vaporized solvents from process exhaust gas and which heats the remaining gas for reuse in the process, thus substantially reducing the fuel requirements of the process;

a more efficient solvent recovery method and apparatus for an industrial dryer;

such a solvent recovery method and apparatus which can easily be incorporated into existing solvent drying devices as well as new installations;

such a system and apparatus which minimizes the risks of explosion by reducing the concentration of oxygen in the industrial dryer so that safe operation of the dryer is permitted at higher solvent concentrations, thereby making the solvent easier to recover;

such a method and apparatus in which a large volume of dryer gas is recirculated through a primary loop for drying purposes and a small volume of dryer gas is recirculated through a secondary or solvent recovery loop for removal of water and solvent;

such a method and apparatus utilizing products of combustion of a natural gas burner as the source of oxygen reduced gas for the oven;

such a method and apparatus in which water is removed, as by a condenser apparatus such as described above, prior to supplying the products of combustion to the dryer;

such a method and apparatus in which the natural gas burner supplies the required energy for the industrial dryer, such as through a hot water boiler;

methods and apparatus for safely permitting the operation of industrial dryer and process oven equipment at five to ten percent solvent vapor concentrations, rather than forty to fifty percent of the solvent LEL;

a closed loop recirculation system for an industrial dryer or process oven incorporating a condenser apparatus of the character described above in combination with an oxygen reduction apparatus for efficiently recovering solvent; and a recirculation system of the aforementioned type which will circulate the quantity of air necessary for the industrial process while maintaining adequate process temperature, material suspension, and specific evaporation rates.

BRIEF DESCRIPTION OF THE DRAWINGS

Other objects and advantages of the present invention will be apparent from the following detailed description of preferred embodiments thereof and from the attached drawings, of which.

DESCRIPTION OF THE PREFERRED EMBODIMENTS

1. The Condenser Apparatus of FIG. 1.

Figure 1:
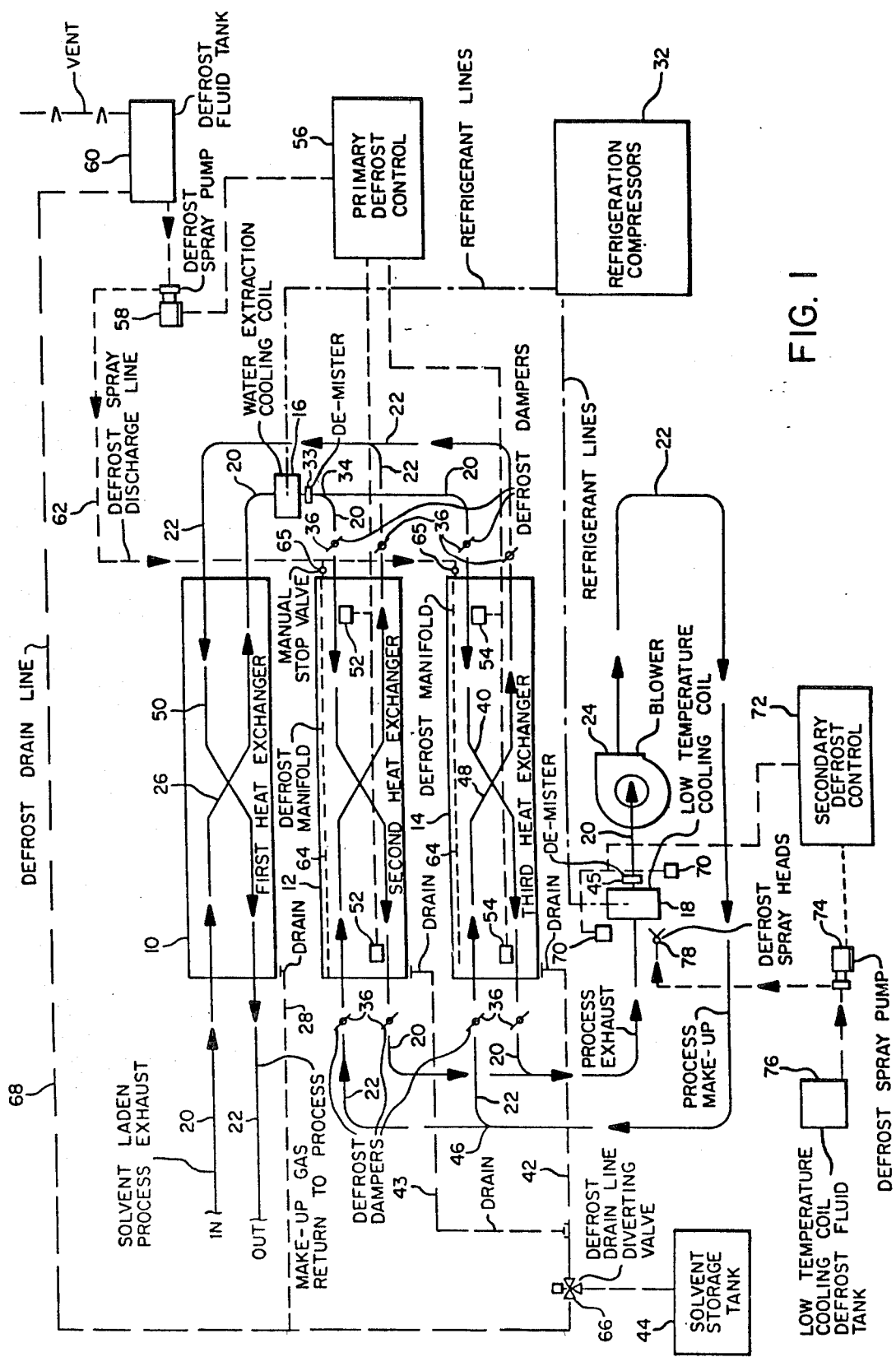
FIG. 1 is a schematic diagram showing one embodiment of the condenser apparatus of the present invention.

Referring to FIG. 1, one preferred embodiment of the condenser apparatus of the present invention includes heat exchanger means in the form of first, second and third counterflow heat exchangers 10, 12 and 14 and refrigerant cooling coil means 16 and 18. The second and third heat exchangers 12 and 14 provide two output stages which are coupled in parallel configuration downstream from an input stage formed by the first heat exchanger 10. Conduit means in the form of forward flow conduits 20 and feedback conduits 22 are provided for interconnecting the first treated gas passages and second cooling gas passages, respectively, of the first, second and third heat exchangers.

Hot process exhaust gas containing vaporized solvent and which may contain vaporized water is moved through first passages in the heat exchangers and conduits 20 past the cooling coil means by a blower 24 to condense first water and then solvent. Thereafter the remaining exhaust gas (termed herein process make-up gas) is fed back through second passages in the first, second and third heat exchangers and conduits 22 in a direction generally opposite to the forward flowing process exhaust. The cooled make-up gas is thus utilized as the cooling fluid for the counterflow heat exchangers. Heat is transferred to the return flowing make-up gas from the forward flowing process exhaust so that the process make-up gas is heated before returning to the process oven. This substantially reduces the fuel requirements of the process.

The first, second and third heat exchangers 10, 12 and 14 are preferably of the counterflow type shown in my U.S. Pat. No. 3,912,004. Each of these heat exchangers contains a first set of passages for the forward flowing process exhaust gas and a second set of passages for cooling fluid. The first and second passages are separated by heat exchange plates. In this type of heat exchanger the opposite ends of a plurality of parallel, vertically extending, corrugated heat exchange plates are split into two end portions which are joined to different ones of the end portions of the two heat exchange plates on the opposite sides thereof. The split ends of the heat exchange plates are separated by divider plates which are sealed to such heat exchange plates by epoxy resin or other suitable air-tight sealing material. This construction provides a first set of passages through which process exhaust gas flows, and a second set of passages through which a cooling fluid flows. Although in many cases less efficient, other forms of heat exchangers, such as of the cross flow type, may also be used.

In the present invention the cooling fluid utilized in the counterflow heat exchangers is the cooled process exhaust gas remaining after water and solvent have been condensed therefrom. As previously indicated, this gas is termed herein process make-up gas. The process exhaust gas and the process make-up gas flow through the counterflow heat exchangers in generally opposite directions.

Turning now to a more detailed description of the condenser apparatus illustrated in FIG. 1, heated process exhaust gas at a temperature of, for example, approximately 150° F., is directed through the input conduit 20 to the first passages of the first counterflow heat exchanger 10. At this point the heated exhaust gas contains significant quantities of vaporized water and organic solvent. The exhaust gas flows through the first passages of the first heat exchanger 10 along a path generally designated 26. The gas is cooled to a temperature of approximately +40° F. to +50° F. as a result of the cool process make-up gas flowing in the opposite direction through the second passages of the heat exchanger 10. Water vapor that condenses inside the heat exchanger 10 at this point flows down the heat exchange plates thereof to the bottom of the heat exchanger. This water is removed through drain means 28 which may take the form of a collection tray at the bottom of the heat exchanger which empties into a tube for conveying it to a storage tank later described.

Next, the now partially cooled process exhaust gas is conveyed through additional forward flow conduits 20 past the first cooling coil means 16. The first cooling coil means 16 includes a refrigerant cooling coil inside the forward flow conduits 20. This cooling coil is a conventional closed refrigeration coil filled with a refrigerant such as Freon which is circulated through a refrigeration compressor 32 in a separate location. The cooling coil of the first cooling coil means 16 lowers the temperature of the process exhaust gas flowing from the first passages of the first heat exchanger 10 to the first passages of the second and third output heat exchangers 12 and 14, sufficiently to condense most of the remaining water vapor therefrom. Preferably this cooling coil is controlled so that the exhaust gas flowing therepast is lowered to a temperature of from about 33° F. to about 35° F. so that a majority of the water vapor still contained in the process exhaust gas is condensed and collected in drain means (not shown) adjacent this cooling coil.

As indicated in my co-pending U.S. patent application Ser. No. 939,334 temperature regulation means may be provided for the cooling coil means 16. A temperature sensor (not shown) may be provided in the forward flow conduits 20 downstream from the cooling coil means 16. This temperature sensor may be connected electrically or pneumatically to a controller which automatically controls the compressor of the cooling coil means. Thus, the temperature sensor measures the temperature of the cooled process exhaust gas after it flows past the cooling coil means 16. As such temperature reaches 33° F., the sensor operates the controller to cause the cooling coil to perform less cooling. The temperature of the cooled process exhaust gas is thereby maintained above 32° F., or such other predetermined temperature at which no frost forms and no condensed water freezes at this location. Likewise the controller keeps the temperature of the gas flowing past the cooling coil means 16 below 35° F.

The cooled process exhaust is now conveyed through additional forward flow conduits 20 past a de-mister 33. Preferably the de-mister comprises a wire mesh screen against which suspended water droplets strike. This water is collected in additional drain means not shown.

After passing the de-mister 33, the cooled process exhaust is conveyed through a Y-type connection 34 in the forward flow conduits 20 to the input ends of the first passages of either of the second and third heat exchangers 12 and 14. As will be described later in greater detail, the condenser apparatus includes two sets of damper means each including four movable dampers 36 for each of the output heat exchangers for opening and closing the first and second passages thereof. The two sets of dampers are alternately operated so that exhaust gas from the first passages of the first heat exchanger 10 flows through the first passages of only one of the second and third heat exchangers at a time while the other heat exchanger is being defrosted.

During normal operation the damper means 36 are actuated to prevent process exhaust gas from flowing into the second heat exchanger and to permit the same to flow into the first passages of the third heat exchanger 14. The exhaust gas flows through the third heat exchanger along a path generally designated 40. As the process exhaust gas, now less a major portion of its water vapor, flows through the first passages of the third heat exchanger 14 it is further cooled as a result of the low temperature process make-up gas flowing in the opposite direction through the second passages thereof. Preferably the exhaust gas flowing through the first passages of the third heat exchanger is cooled sufficiently at this point so that a major portion of the vaporized organic solvent is condensed on the heat exchange plates thereof. This condensed solvent is collected in drain means 42 similar to the drain means 28 of the first heat exchanger 10. The second heat exchanger 12 has similar drain means 43. Collected solvent is conveyed to a solvent storage tank 44.

Process exhaust gas discharged from the first passages of the third heat exchanger 14 is conveyed through additional forward flow conduits 20 past the second cooling coil means 18. This cooling means includes a low temperature cooling coil which conveys refrigerant supplied by a separate compressor in the location 32. This coil provides a suction temperature adjusted to the characteristics of the solvent vapor being treated to condense the solvent from the gas. Typically this low temperature cooling coil may provide a suction temperature down to about −60° F. As a result, the exhaust gas flowing past the same is cooled to a temperature of about 10° F. higher than the suction temperature, for example about −50° F. in some cases. A second de-mister 45 downstream from the cooling coil means 18 collects suspended droplets of condensed solvent. Any remaining vaporized solvent at the location of the cooling coil means 18 and the de-mister 45 is collected in an additional drain means (not shown) and conveyed to the solvent storage tank 44.

After the process exhaust gas has flowed past the low temperature cooling coil means 18 it is conveyed through additional forward flow conduits 20 to the blower 24 which serves to move the process gas through the passages of the heat exchangers 10, 12 and 14 and past the cooling coil means 16 and 18. Typically the blower 24 is of the AMCA, type A, explosion proof construction classification. The process gas is now virtually free of vaporized water and solvent and is now termed process make-up gas.

The process make-up gas discharged from the blower 24 is returned through feedback conduits 22 to another Y-type coupling 46. The damper means 36 have been previously actuated so that the low temperature process make-up gas can only flow into the second passages of the third heat exchanger. This low temperature process make-up gas flows through the second passages of the third heat exchanger 14 along a path 48. The make-up gas cools the process exhaust gas flowing in the opposite direction through the first passages sufficiently so that a majority of the solvent condenses in such heat exchanger. There is a corresponding increase in the temperature of the process make-up gas.

Process make-up gas discharged from the second passages of the third heat exchanger 14 is conveyed through feedback conduits 22 back to the first heat exchanger 10 and flows through the second passages thereof along a path 50. The process make-up gas flowing through the first heat exchanger 10 serves to cool the incoming relatively warm process exhaust gas, thus reducing the load on the cooling coil means 16. The temperature of the process make-up air flowing through the first heat exchanger 10 is correspondingly increased and is returned through feedback conduits 22 for reuse in the process. Thus, the process make-up gas operates as the cooling fluid of the heat exchangers and by the time it has been returned to the process it has been reheated considerably, e.g. seventy to eighty-five percent of its starting temperature, thus substantially reducing the fuel requirements of the process.

To summarize, during the air flow processes described above, process exhaust gas (vapor laden) is reduced in temperature within the heat exchangers while the process make-up gas is increased in temperature due to the heat transfer characteristics of the heat exchangers. Utilization of the fixed plate counterflow heat exchangers reduces the mechanical refrigeration load required to satisfactorily condense solvents from the process exhaust gas. The temperatures of the cooling coil means 16 and 18 can be adjusted so that a majority of the water vapor will be condensed in the first heat exchanger 10 and a majority of the vaporized solvent will be condensed in either of the second and third heat exchangers 12 and 14.

While a major portion of the water vapor is condensed before the process exhaust gas enters the first passages of either of the second and third heat exchangers 12 and 14, a minor amount of moisture remains with the solvent laden air stream. This moisture will collect on the plates of the second and third heat exchangers in the form of frost. Collection of frost is detrimental to the system air flow and solvent recovery efficiency. Therefore, the present invention includes automatic defrost means for alternately directing the exhaust gas from the first passages of the first heat exchanger through the first passages of only one of the second and third heat exchangers while defrosting the other one of the second and third heat exchangers when a predetermined amount of frost on the heat exchange members thereof has been detected.

Sensing means are provided for independently detecting the presence of a predetermined amount of frost on the plates in either of the second and third heat exchangers formed from the remaining water vapor. The sensing means preferably include two pairs of sensors 52 and 54 for the second and third heat exchangers, respectively, which monitor the differential gas pressure or differential gas temperature, or a combination of both, between the opposite ends of the first passages of the second and third heat exchangers. The sensors 52 and 54 transmit electrical output signals corresponding to the pressure and/or temperature to a differential amplifier in a defrost control device 56. The control device has a voltage comparator which compares the differential amplifier output with a reference voltage corresponding to a predetermined maximum pressure difference or temperature difference caused by a predetermined amount of frost. The control actuates the damper means 36 when the output of the differential amplifier exceeds the reference voltage. Of course, other sensing means are also suitable.

During normal operation of the condenser apparatus, the dampers of the damper means 36, which may comprise pivoting closure panels, are positioned so that process exhaust gas and process make-up gas can flow through the third heat exchanger 14 only and not through the second heat exchanger 12. Eventually the sensors 54 detect a sufficient pressure increase or temperature increase associated with the build up of a predetermined amount of frost on the plates of the third heat exchanger 14. The defrost control 56 in response thereto closes the four dampers of the third heat exchanger and opens the four dampers of second heat exchanger, permitting condensation of solvents in the second heat exchanger. At the same time the defrost control actuates a defrost spray pump 58 which causes a defrost fluid from a tank 60 to be delivered through conduits 62 to a defrost manifold 16 in the heat exchanger 14. This manifold discharges the defrost fluid along the upper peripheries of the heat exchange plates of the heat exchanger so that the fluid will flow down the length thereof to defrost the plates. The second heat exchanger 12 has a similar manifold 64. Automatic stop valves 65 are provided for automatically shutting off the delivery of defrost fluid to the manifolds 64 from the pump 58. The stop valve for heat exchanger 12 is closed while the valve for heat exchanger 14 is open under the above conditions.

The defrost fluid and the resulting water from the melted frost in the third heat exchanger 14 are conveyed from the third heat exchanger through the drain means 42. Prior to this operation a three-way valve 66 connected in the drain lines 42, 43 and 68 is automatically positioned by the defrost control 56 so that the defrost fluid and the melted frost are conveyed from the drain means 42 through a gravity fed defrost drain line 68 back to the defrost fluid tank 60. In the defrost fluid tank the defrost fluid separates from the water so that the fluid can be reused. The water drain means 28 of the first heat exchanger 10 also empties into the drain line 68.

The defrost control 56 may include a timing mechanism so that at the conclusion of a specific time interval the defrost spray pump 58 is de-actuated and the three-way valve 66 is repositioned so that solvent from the drain means 43 of the second heat exchanger can flow into the solvent storage tank 44. At the same time the defrost control 56 opens the dampers of the damper means 36 of both the second and third heat exchangers 12 and 14 so that the third heat exchanger 14, just defrosted, can be pre-cooled while the second heat exchanger 12 is still functioning to recover solvent. After another time interval, the defrost control 56 closes the dampers of the second heat exchanger 12 so that the third heat exchanger will once again perform the solvent recovery function on a sole basis.

Alternatively, the defrost control 56 can be designed so that after the defrosting of the third heat exchanger 14, the solvent recovery function will continue to be performed solely by the second heat exchanger 12 until such time as the sensors 52 of such second heat exchanger detect the presence of the predetermined amount of frost on the plates thereof. At this time the control 56 operates the damper means 36 to switch the solvent recovery function back to the now defrosted third heat exchanger 14. At the same time the second heat exchanger is defrosted.

Due to the extremely low temperatures involved at the low temperature cooling coil means 18, even very minor amounts of water vapor remaining in the process exhaust gas at this point will freeze and form ice on such cooling coil means. Formation of ice or frost on this cooling means is also detrimental to both gas flow and heat exchange efficiency. Therefore, the condenser apparatus of the present invention preferably includes secondary sensing means for detecting the presence of a predetermined amount of frost on the low temperature cooling coil means 18. In addition, a secondary automatic defrost means responsive to such secondary sensing means is provided for defrosting the low temperature cooling coil means upon detection of this predetermined amount of frost buildup thereon.

The secondary sensing means may take the form of sensors 70 mounted for monitoring the pressure or temperature differential, or a combination of both, of the exhaust gas flowing past the low temperature cooling coil means 18. The sensors 70 are operatively connected to a secondary defrost control 72. Upon the sensing of frost build up on the cooling coil means 18 detected by the sensors 70 the secondary defrost control 72 will actuate a second defrost spray pump 74. It pumps defrost fluid such as alcohol from a second defrost fluid tank 76 to spray heads 78 which discharge the defrost fluid onto the cooling coil means 18. The defrost fluid is collected in drain means (not shown) and returned to the second tank 76.

Preferably the secondary defrost control 72 includes an electric sequence timer for actuating the pump 74 in sequential steps to provide intermittent spraying automatically. This spray continues until such time as the sensors 72 no longer detect the abnormal pressure or temperature across the cooling coil means 18 associated with excessive frost buildup.

2. The Condenser Apparatus of FIG. 3.

Figure 3:
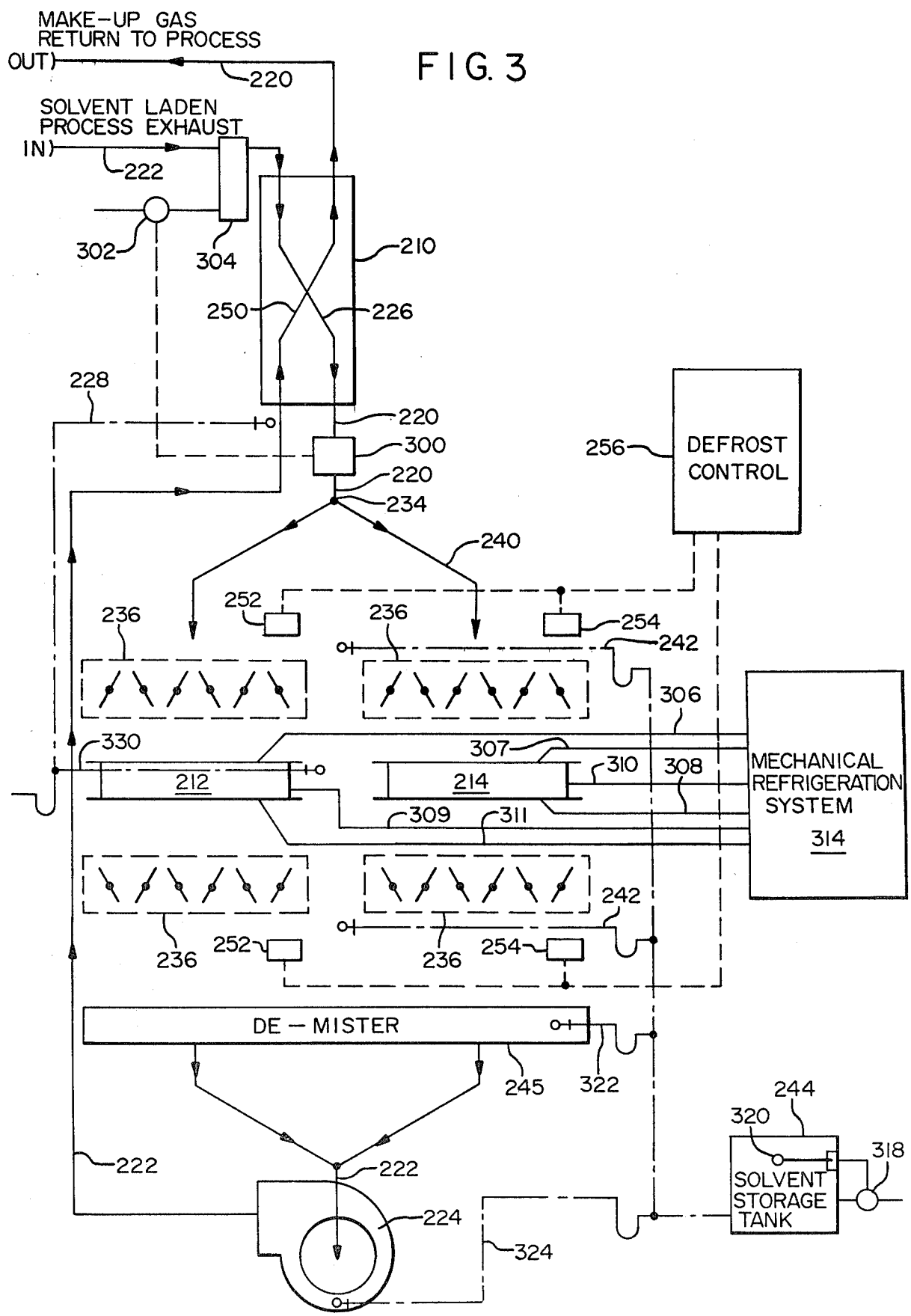
FIG. 3 is a schematic diagram showing another embodiment of the condenser apparatus of the present invention.

FIG. 3 discloses an alternate preferred embodiment of the condenser apparatus of the present invention. For convenience, the components of the FIG. 3 embodiment in common with the FIG. 1 embodiment are designated by numbers which differ by two hundred. The FIG. 3 condenser apparatus includes heat exchanger means in the form of a first counterflow heat exchanger 210 and second and third side-by-side separate refrigerant cooling coil means 212, 214. The second and third coils 212, 214 provide two output stages which are coupled in parallel configuration downstream from an input stage formed by the first heat exchanger 210. Conduit means in the form of forward flow conduits 220 connect the first treated gas passages of heat exchanger 210 to the inlet gas passages of coils 212, 214.

Also, feedback conduits 222 connect the outlet gas passages of the coils to the second cooling gas passages of heat exchanger 210.

The heated process exhaust gas is moved by blower 224 along path 226 through the first passages of the first heat exchanger 210. The gas is cooled from an initial temperature of, for example, 150° F. to a temperature of approximately +33° F. to +35° F. as a result of the cool process make-up gas flowing in the opposite direction through the second passages 250 of heat exchanger 210. The majority of water vapor in the exhaust gas condenses inside the heat exchanger 210 and flows down the heat exchange plates thereof to the bottom of the heat exchanger and then to a water drain 228.

A temperature sensor 300 is positioned in forward flow conduits 220 downstream from heat exchanger 210. Sensor 300 is connected electrically or pneumatically to a valve 302 which controls the temperature of a heater 304 in conduit 220 upstream from the heat exchanger. Heater 304 may comprise a steam or hot water supplied coil with valve 302 controlling the hot water supply to in turn control the temperature of the coil and hence the heating of exhaust gas passing through the coil to heat exchanger 210. Preferably, heater 304 is operated to maintain the temperature of exhaust gas from heat exchanger 210 above 32° F., or such other predetermined temperature at which no frost forms and no condensed water freezes at this location, and below 35° F.

The cooled process exhaust is then conveyed through a Y-type connection 234 in the forward flow conduits 220 to the input ends of passages through refrigeration coils 212, 214. Coils 212, 214 are conventional closed refrigeration coils filled with a refrigerant which is circulated through a refrigeration compressor 314 and a condensing system.

The condenser apparatus includes two sets of damper means 236, each set including six movable dampers, for each of the output heat exchangers 212, 214. The two sets of dampers are alternately operated so that exhaust gas from the first passages of the first heat exchanger 210 flows past only one of the coils 212, 214 at a time while the other coil is being defrosted.

During normal operation the damper means 236 are actuated to prevent process exhaust gas from flowing through coil 212 while permitting its flow through coil 214 along a path 240. At the same time, liquid refrigerant flows on a line 307 from a conventional mechanical refrigeration system 314 and is expanded in coil 214 so that the exhaust gas flowing across this coil is cooled sufficiently at this point, i.e. in certain applications to approximately −50° F. so that a major portion of the vaporized organic solvent is condensed. This condensed solvent is collected in drain means 242 and conveyed to a tank 244 for subsequent pumping by a pump 318 to a remote location in response to the level of a float 320. A suction line 308 provides a return path to refrigeration system 314.

A de-mister 245 downstream from coil 214 collects suspended droplets of condensed solvent for conveyance via a drain line 322 to tank 244.

A blower 224 downstream from de-mister 245 moves the gas through the condenser apparatus. Furthermore, because blower 224 is at the coldest temperature level in the condenser apparatus it acts as a centrifuge to remove additional solvent droplets from the gas stream. A drain line 324 carries this solvent to tank 244. Thus, the process gas leaving blower 224 is now virtually free of vaporized water and solvent.

The process make-up gas discharged from the blower 224 is returned through feedback conduits 222 and the second passages of heat exchanger 210, along path 250, to the process. This causes cooling of solvent laden process gas entering heat exchanger 210 so that a majority of the water condenses in this heat exchanger. There is a corresponding increase in the temperature of the process make-up gas. Thus, by the time this gas is returned to the process it has been reheated considerably so that fuel requirements of the process are reduced.

The minor amount of moisture remaining within the solvent laden air stream which reaches coils 212, 214 will collect on the operating one of these heat exchangers in the form of frost. Collection of frost is detrimental to the system air flow and solvent recovery efficiency. Therefore, this form of the invention also includes automatic defrost means for alternately directing the exhaust gas from the first passages of the first heat exchanger through a passage across only one of the coils 212, 214 while defrosting the other, when a predetermined amount of frost has been detected.

As in the FIG. 1 embodiment, this embodiment also includes sensing means which detect the presence of a predetermined amount of frost on either coils 212 or 214. The sensing means may comprise two pairs of sensors 252, 254 for heating coils 212, 214, respectively, which monitor the differential gas pressure or differential gas temperature, or a combination of both between the inlet and outlet exhaust gas passage of the coils. Signals from sensors 252, 254 are transmitted to a defrost control device 256 which may be operable like the previously described sensors 52, 54 and defrost control 56 to control dampers 236.

After gas has passed through coil 214 for a time, sensor 254 will detect a sufficient pressure or temperature increase associated with the build up of a predetermined amount of frost on the coil 214. As a result, defrost control 256 closes the set of dampers 236 associated with coil 214 and opens the set of dampers associated with coil 212 so that exhaust gas flows past this latter coil only. At the same time liquid refrigerant is fed on line 306 to coil 212 for expansion therein for cooling purposes. A suction line 311 is provided for coil 212 as well. Also, the flow of liquid refrigerant to coil 214 is halted. Meanwhile hot gas from the compressor discharge of refrigeration system 314 is routed through the now inactive coil 214 along a hot gas defrost line 310 until all frost is melted from the surface of the coil 214. Thus, defrost gas is not mixed with the process gas flowing through the condenser apparatus. Water from frost melted from coil 214 is carried off through a drain conduit 330.

The defrost control 256 may include a timing mechanism which stops hot gas flow to the nonoperating coil 214. Only a short time interval is required for defrost by this method. Of course, alternate means, such as electric resistant heat coils can be used for defrosting refrigeration coils 212, 214. At the end of this time interval, the flow of hot gas on line 310 is stopped and liquid refrigerant is fed again on line 307 to coil 214. In addition, the defrost control 256 opens the set of dampers associated with coil 214 and closes the set associated with coil 212 so that coil 214 becomes the operating coil. Furthermore, the refrigerant flow on line 306 is halted and hot defrost gas is fed on a line 309 to coil 212 to defrost this latter coil. The above cycle is repeated when coil 214 again frosts up.

Alternatively, the defrost control 256 can be designed so that after the defrosting of coil 214, the solvent recovery function will continue to be performed solely by the coil 212 until sensor 252 detects the presence of the predetermined amount of frost in coil 212. At this time the control 256 operates the damper means and valves to switch the solvent recovery function back to the then defrosted coil 214 and coil 212 is defrosted.

3. The Recirculation System for an Industrial Dryer or Process Oven of FIGS. 2 and 4.

Figure 2:
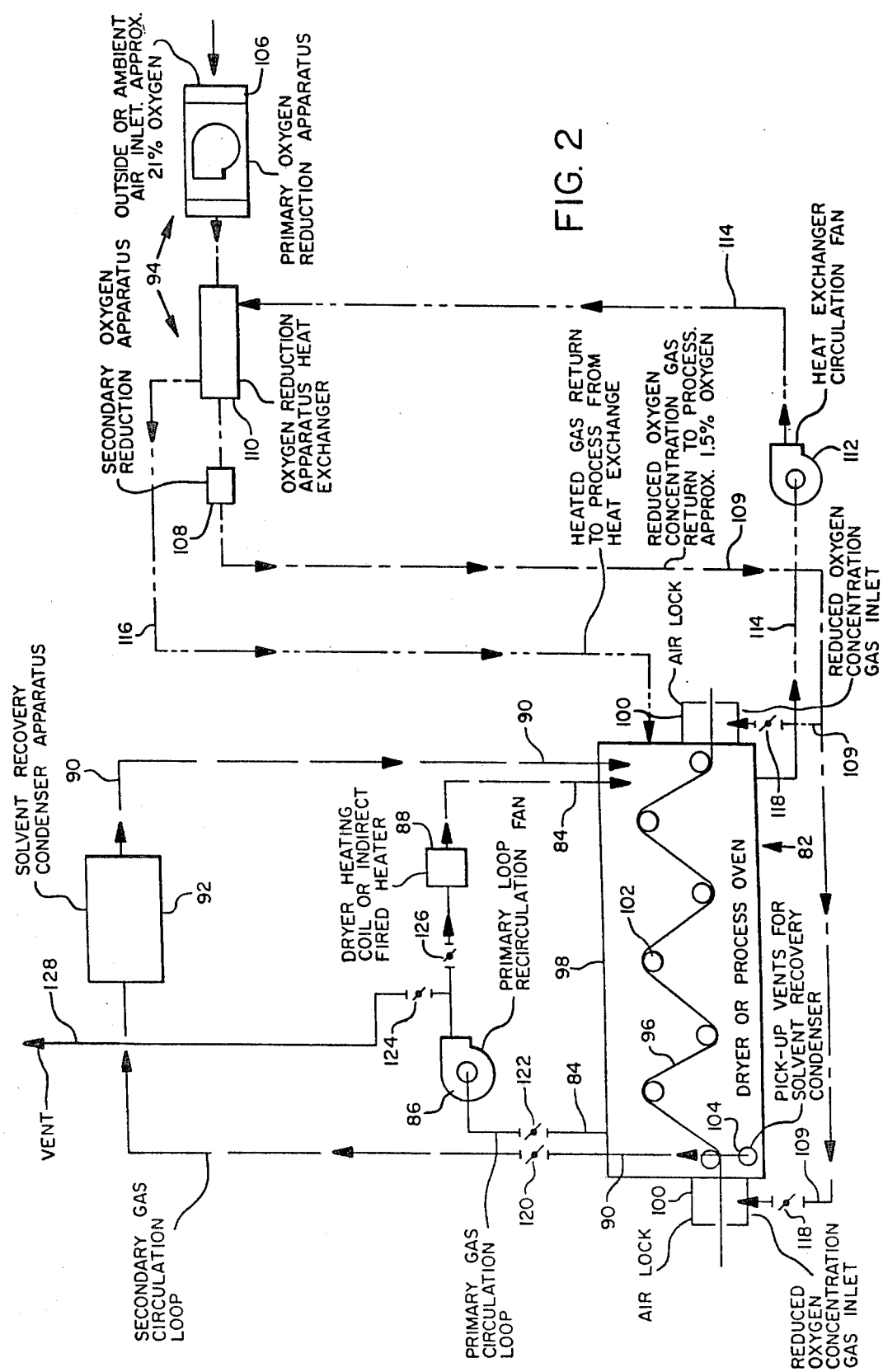
FIG. 2 is a schematic diagram showing one embodiment of the closed loop recirculation system of the present invention adapted for use with an industrial dryer or process oven, such system including the condenser apparatus of FIGS. 1 or 3.

Referring to FIG. 2, one embodiment of the recirculation system of the present invention includes a dryer or process oven 82, a primary loop 84 for recirculating a major portion of the system gas including a blower 86 and a heater 88, and a secondary loop 90 for recirculating the remaining portion of the system gas. The secondary loop 90 preferably includes the condenser apparatus 92 of FIG. 1, although other condenser apparatus capable of efficiently recovering solvents may be utilized. The system may further include oxygen reduction means 94 for rendering the system gas substantially incapable of supporting combustion.

The dryer or process oven 82 may be of the type utilized in drying industrial products such as, for example, large volumes of newspaper print where the printing ink consists of, for example, seventy percent by weight organic solvent and thirty percent by weight pigment solids or automobile seat fabric coated with a mixture of vinyl (i.e. approximately fifteen percent by volume) and organic solvent (i.e. approximately eighty-five percent by volume methyl ethyl ketone). The dryer is contained within a substantially closed casing 98 having airlocks 100 at opposite ends thereof for infeed and outfeed of the product 96 which travels in an arc over a plurality of high speed rollers 102 mounted within the casing. The airlocks 100 minimize the infiltration of moisture laden ambient air into the dryer and prevent leakage of solvent laden inert gas into the work area.

A typical oven of this type requires a large quantity of a gas, typically outside air to be circulated therethrough at an elevated temperature as required by certain aspects of the process, e.g. sufficient solvent drying and product suspension. The quantity of air circulated within the dryer must be sufficient to provide specific evaporation rates. Heretofore the system gas has largely been exhausted from the dryer into the atmosphere. Large quantities of vaporized organic solvents, for example fifteen pounds per minute have thus been introduced into the atmosphere as contaminants.

As a more specific example of the system of the present invention, consider the application in which automobile fabric is coated with a mixture of methyl ethyl ketone and vinyl. This fabric continuously enters the entry airlock 100, is dried within oven 82 and the cured fabric exits from the exit airlock 100. Drying is accomplished by oven gas recirculating in the primary loop 84, through heater 88, at an exemplary rate of 10,000 cubic feet per minute. This, a major portion, e.g. fifty to ninety percent of the system gas is recirculated through primary loop 84.

In order for a solvent recovery condenser apparatus to operate most efficiently in connection with such a dryer, process exhaust gas fed therethrough should be heavily laden with vaporized solvents. However, increases in the solvent concentration in the oven gas increases the possibility of an explosion in the system.

To prevent the hazard of such an explosion, and insure safe operation of such a dryer or process oven at higher solvent concentrations, oxygen reduction means 94 may be incorporated into the system to reduce the concentration of oxygen to a level below that which combustion is possible. In such a case it is necessary to maintain a slight negative pressure inside dryer casing 98 to prevent leakage of potentially combustible solvent laden vapor from the oven.

A primary oxygen reduction apparatus 106 and optional secondary catalytic type oxygen reduction apparatus 108 are utilized in this embodiment to reduce the oxygen concentration of the oven gas. The primary oxygen reduction apparatus may comprise a natural gas burner which strips oxygen from air utilized during combustion and supplies its combustion products to the oven. This reduces the oxygen concentration of outside ambient air from approximately twenty-one percent to approximately one and one-half percent before the same is introduced through conduits 109, and through the airlocks 100 into the dryer casing. This oxygen reduced environment, together with the incorporation of oxygen level monitoring, recording and alarm devices, permits safe operation of the entire closed loop system at five to ten percent, or higher of the solvent in reference to the overall system gas. In contrast, for a typical solvent such as toluene in a non-oxygen reduced system, a solvent concentration of 0.625 percent or lower must be maintained. These higher solvent concentrations in turn facilitate the recovery of solvent, by condensation, from a portion of the oven gas.

The remaining portion of the system gas is circulated through a solvent recovery condenser apparatus 92 in secondary loop 90, which may be of the type illustrated in FIGS. 1 and 3 as previously described in detail. Only a small fraction of gas from the oven is recirculated in the secondary loop. This reduces the size requirements and increases the efficiency of solvent recovery in condenser apparatus 92. As a specific example, recirculation of oven gas at the rate of five hundred cubic feet per minute in loop 90 is adequate for many applications. Also, the system gas that is recirculated through the secondary loop 90 is extracted at a pick-up point 104 through vents adjacent to a region within the dryer having the highest concentration of vaporized solvents.

The primary oxygen reduction apparatus 106 raises the temperature of the air processed therethrough considerably. In this embodiment, the discharge of this apparatus is passed through a heat exchanger 110, such as of the shell and tube type, to reduce it to a temperature level acceptable to the optional secondary catalytic oxygen reduction apparatus 108 and suitable for use in drying the particular product fed through the dryer. A heat exchanger circulation fan 112 circulates a portion of the dryer system gas through a conduit 114 to the heat exchanger 110 for elevating the temperature thereof before returning the same through a conduit 116 to the dryer casing 98. The heat thus extracted by the heat exchanger 110 is returned to the dryer casing to reduce the amount of fuel required to maintain the required process temperature within the dryer. The oxygen reduction means 94 thus eliminates the danger of combustion in the dryer.

The system of FIG. 2 further includes dampers 118 for opening and closing the reduced oxygen concentration gas supply conduits 109. When dampers 118 are closed, reduced oxygen gas flows through a start-up gas supply line to the oven. In contrast, when dampers 118 are open, oxygen reduced gas is supplied to airlocks 100. Dampers 120 and 122 are provided for controlling flow of gas through the secondary and primary loops 90 and 84, respectively. Dampers 124 and 126 are provided for purging system gas to the atmosphere through a vent 128 in an emergency situation.

Figure 4:
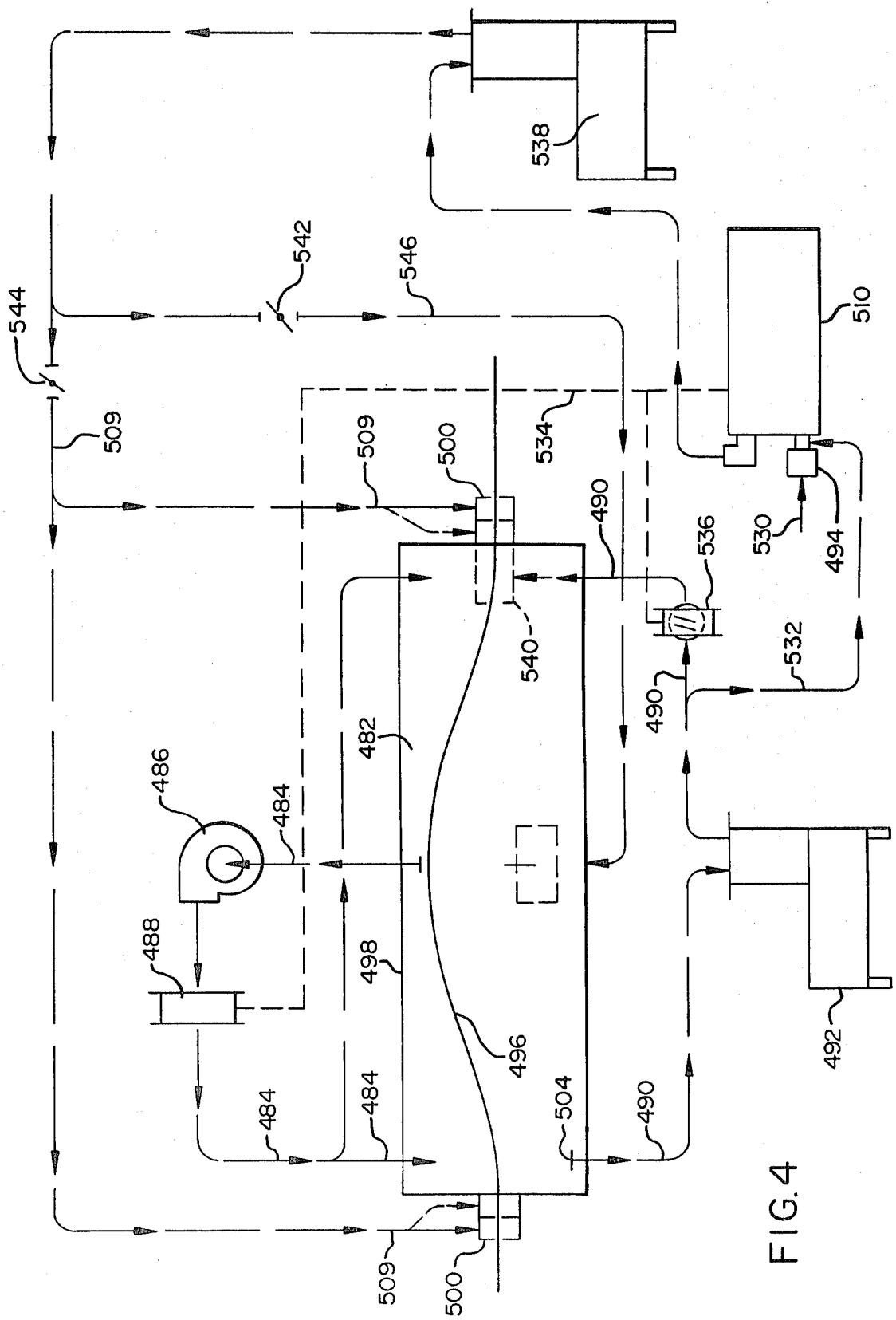
FIG. 4 is a schematic diagram showing another embodiment of the closed loop recirculation system of the present invention adapted for use with an industrial dryer or process oven, such system including the apparatus of FIGS. 1 or 3.

For convenience, the components of the system embodiment of FIG. 4 bear numbers three hundred greater than the numbers designating similar components of the FIG. 2 embodiment. These common components have previously been described and therefore the description will not be repeated.

In FIG. 4, oxygen reduction means 494 comprises a natural gas burner supplied with combustion air through a conduit 530 and with natural gas from a source not shown. In addition, for the purpose of maintaining a negative pressure in dryer 498, as explained below, a small volume of treated oven gas, that is from which water and solvent have been removed by condenser apparatus 492 is fed from loop 490 to burner 494 along a conduit 532. Burner 494 heats this treated gas and burns any remaining solvent from it. Typically, secondary gas flows at approximately one hundred cubic feet per minute through conduit 532 and is supplemented by approximately one hundred cubic feet per minute of product of combustion.

The oxygen reduced gas from burner 494 is fed through a heat exchanger, which may take the form of a multi-pass hot water boiler 510 which reduces it in temperature to a level usable by the system. Also, hot water generated within boiler 510 is piped through conduits 534 to heater 488, which in this illustrated form comprises a water heating coil, to supply the required heat for the dryer. Hot water from boiler 510 is also transmitted through conduits 534 to a heater or pre-heat coil 536. Pre-heat coil 536 heats treated gas leaving condenser 492 to a range typically of from 110° F. to 180° F. prior to its entry into oven 482. Thus, burner 494 supplies both oxygen reduced gas for the oven and the heat required by the oven for drying purposes.

As previously mentioned, a negative pressure is maintained in dryer 498. This occurs because more gas is being withdrawn from the oven along secondary loop 490 (i.e. five hundred cubic feet per minute) than is being returned through pre-heat coil 536 (i.e. four hundred cubic feet per minute) because of the secondary gas (i.e. one hundred cubic feet per minute) fed by conduit 532 to burner 494.

This lost gas is then made up by the gas from boiler 510 that reaches airlocks 500. That is, from boiler 510, the oxygen reduced gas may be fed directly to conduits 509 and to airlocks 500 or through an optional condenser apparatus 538 between boiler 510 and conduits 509. With the system balanced and two hundred cubic feet per minute supplied through conduits 509, approximately one hundred cubic feet per minute reaches each airlock 500. Of this, approximately fifty cubic feet per minute oxygen reduced gas enters the oven from each airlock to make up the gas removed on line 532 while about fifty cubic feet per minute of the oxygen reduced gas exits outwardly from each air lock and blocks the entry of ambient air into the oven.

Of course, these flow rates may vary for varying applications. However, the recirculation of a large volume of gas through a primary loop and only a small volume of gas through a secondary loop makes the system very efficient. It significantly reduces the load on the condenser apparatus because it does not have to remove solvent from all of the recirculated oven gas, but only from the minor portion flowing in the secondary loop. Furthermore, a conventional solvent concentration monitoring device (not shown) can be installed in the dryer or process oven and be operable to control a damper (not shown) positioned in the secondary loop, such as upstream of the condenser in this loop, to regulate the flow of oven gas in the secondary loop responsive to the concentration of solvent in the dryer. Thus, gas flow in the secondary loop can be reduced even further by the damper when solvent concentrations are low to thereby further reduce the loading on the condenser.

More importantly, whether or not the invention is used in an application where an oxygen reduced environment is maintained in the oven, the introduction of water vapor into this system is kept to a minimum. Hence, the load on the condenser apparatus in the secondary loop is reduced because of reduced water vapor in the system gas. That is, only a very small amount of gas containing water vapor is introduced into the dryer as the system operates. In the above example, in addition to incidental leakage, only fifty cubic feet per minute of gas enters the dryer at each airlock. Furthermore, this gas is of low water vapor content because it is a mixture of virtually water free gas from conduit 532 and products of combustion from the burner, which contains some water vapor (unless the mixture is treated by optional condenser 538 as explained below). Therefore, introduction of water vapor into the system is minimized.

Also, when included, condenser 538 may comprise a condenser apparatus such as previously described in connection with FIGS. 1 and 3, and is operable to condense water from the oxygen reduced gas from burner 494 prior to its entering the process dryer or oven. With condenser 538 in place, the water vapor concentration in the gas entering conduits 509 is reduced to approximately 0.5 percent or less. By removal of water at this location, the load on condenser 492 is reduced because less water vapor is present in the gas flowing to it in secondary loop 490.

Treated gas in line 490 flows from heater 536 to a purge section 540 of exit airlock 500 in which it flows past and sweeps the product free of remaining solvent just prior to its exit from the dryer. In addition, a bypass valve 542 normally blocks the flow of gas to the oven through a startup conduit 546 while a valve 544 normally permits the flow of gas from the condenser apparatus 538 to conduits 509. However, prior to operation of the system, valve 542 is opened and valve 544 is closed until the oven fills with oxygen reduced gas via conduit 546. Subsequently, additional oxygen reduced gas is supplied, as necessary, through airlocks 500.

Having described preferred embodiments of the present invention it will be apparent to those skilled in the art that the invention permits of modification in both arrangement and detail. For example, in the recirculation system various types of solvent condenser apparatus may be utilized instead of the condenser apparatus of FIG. 1. However, the true spirit and scope of the present invention should be limited only in accordance with the scope of the following claims.

I claim:

1. A gas recirculation system for operating with an industrial dryer or process oven for drying articles passing therethrough and producing a process gas containing a combustible vaporized solvent comprising:

condenser means for condensing to a recoverable liquid from said process gas a portion at least of said vaporized solvent;

combustion means connected to receive process gas from which vaporized solvent has been removed by said condenser means for reducing the oxygen content of a portion at least of said process gas to render the gas incapable of supporting combustion comprising a natural gas burner, and including means for withdrawing a portion at least of the system gas from the oven and passing said withdrawn portion through the burner to reduce the available oxygen therein and produce products of combustion in the form of combustion gases, and conduit means for returning a portion at least of the combustion gases produced by said combustion means to the dryer or process oven to create an atmosphere therewithin incapable of supporting combustion.

2. The gas recirculation system according to claim 1 including means for supplying a supply of supplemental combustion air to said burner.

3. The gas recirculation system according to claim 1 wherein a first portion of the solvent reduced process gas from said condenser means is returned to the dryer or process oven and a second portion of the solvent reduced process gas from said condenser means is supplied to said combustion means.

4. The gas recirculation system according to claim 3 including damper means positioned between said combustion means and the dryer or process oven for controlling the amount of process gas returned to the dryer or process oven.

5. The gas recirculation system according to claim 1 including inlet air lock means through which the articles enter the dryer or process oven and outlet air lock means through which the articles exit from the dryer or process oven, said combustion means supplying oxygen reduced gas to the inlet and outlet air lock means to substantially prevent ambient air from entering the dryer or process oven.

6. The gas recirculation system according to claim 1 including by-pass conduit means for carrying oxygen reduced gas to the dryer or process oven from the combustion means prior to starting the operation of the dryer or process oven to thereby initially supply the dryer or process oven with oxygen reduced gas.

7. The gas recirculation system according to claim 1 including second condenser apparatus means for removing water vapor from the combustion gas produced by said combustion means prior to supplying the combustion gas to the dryer or process oven.

8. The gas recirculation system according to claim 1 including means for recovering heat generated by said combustion means and for supplying said heat to heat the process gas.

9. The gas recirculation system according to claim 1 including the industrial dryer or process oven.

10. The gas recirculation system according to claim 1 including means for supplying a supply of supplemental combustion air to said burner, said burner operating to reduce the oxygen content of the process gas passing therethrough to render the gas incapable of supporting combustion, a first portion of the solvent reduced process gas from said condenser means being returned to the dryer or process oven and a second portion of the solvent reduced process gas from said condenser means being supplied to said combustion means.

11. The gas recirculation system according to claim 10 wherein said dryer or process oven has a substantially closed casing and said gas recirculation system forms a closed loop.

12. The method of operating an industrial dryer or process oven of the type for drying articles passing therethrough and producing a process gas containing a combustible vaporized solvent, said method comprising the steps of:

condensing to a recoverable liquid from the process gas a portion at least of the vaporized solvent in a condensing means;

thereafter reducing the oxygen content of a portion at least of the process gas by withdrawing a portion at least of the system gas from the condensing means, passing said withdrawn portion through a natural gas burner to reduce the available oxygen therein to produce products of combustion in the form of combustion gases; and thereafter recirculating a portion at least of the combustion gases to the dryer or process oven to create an atmosphere therewithin incapable of supporting combustion.

13. The method according to claim 12 including the step of supplying a supply of supplemental combustion air with the natural gas.

14. The method according to claim 12 wherein a first portion of the solvent reduced process gas following said condensing step is returned to the dryer or process oven and a second portion of the solvent reduced process gas following said condenser step is reduced in oxygen content.

15. The method according to claim 14 including the step of controlling the amount of process gas returned to the dryer or process oven.

16. The method according to claim 12 including the step of providing combustion gases to the dryer or process oven prior to starting the operation of the dryer or process oven to thereby initially supply the dryer or process oven with oxygen reduced gas.

17. The method according to claim 12 including the step of removing water from the combustion gas prior to supplying it to the industrial dryer or process oven.

18. The method according to claim 12 including the step of heating the process gas with heat generated by reducing the oxygen content of the process gas.

* * * * *